United States Patent [19]

Paton et al.

[11] Patent Number: 4,738,437
[45] Date of Patent: Apr. 19, 1988

[54] FRICTIONALLY DAMPED SUSPENSION STRUT

[75] Inventors: H. Neil Paton, 2521 W. Montlake Pl. East, Seattle, Wash. 98112; Frank F. Smith, Seattle, Wash.

[73] Assignees: H. Neil Paton; John B. Skilling, both of Seattle, Wash.

[21] Appl. No.: 27,749

[22] Filed: Feb. 26, 1987

Related U.S. Application Data

[63] Continuation-in-part of Ser. No. 743,935, Jun. 12, 1985, abandoned.

[51] Int. Cl.⁴ ............................................. F16F 3/08
[52] U.S. Cl. ................................. 267/196; 188/129
[58] Field of Search ............... 74/531; 188/67, 129, 188/381; 267/35, 140.1, 152, 196, 202, 214, 259

[56] References Cited

U.S. PATENT DOCUMENTS

| | | | |
|---|---|---|---|
| 2,056,106 | 9/1936 | Kuhn | 267/35 |
| 2,819,060 | 1/1958 | Neidhart | 188/129 |
| 2,819,063 | 1/1958 | Neidhart | 188/129 |
| 4,256,292 | 3/1981 | Sullivan, Jr. et al. | 267/220 |
| 4,415,146 | 11/1983 | Sitko | 267/196 |
| 4,473,216 | 9/1984 | Paton et al. | 267/202 |
| 4,475,722 | 10/1984 | Paton et al. | 267/202 |

FOREIGN PATENT DOCUMENTS

| | | | |
|---|---|---|---|
| 58043 | 8/1982 | European Pat. Off. | |
| 850684 | 9/1952 | Fed. Rep. of Germany | |
| 57-33008 | 2/1982 | Japan | |
| 58-118344 | 7/1983 | Japan | 267/152 |
| 59-40040 | 3/1984 | Japan | |

OTHER PUBLICATIONS

Rowland, "Suspension Simplicity from Paton," Automotive News, Jul. 18, 1986, at 32.
The Paton Corp., "The Electronic Suspension Revolution and the Paton Dry-Namic TM (Non-Hydraulic) Suspensions," Jun. 1986.

Primary Examiner—Duane A. Reger
Attorney, Agent, or Firm—Finnegan, Henderson, Farabow, Garrett & Dunner

[57] ABSTRACT

The strut includes a telescoping load bearing assembly that extends through a composite spring and a frictional damping assembly. The damping assembly includes one, two three or more movable damper wedges that are urged by two wedge rings against a sleeve bearing that normally provides for low friction extension and contraction of the load bearing assembly. In response to application of an axial load on the load bearing assembly, however, the damper wedges press or squeeze the sleeve bearing into gripping engagement with the load bearing assembly, which causes the sleeve bearing to apply a frictional damping force to the load bearing assembly. Elastomer layers interposed between the interactive faces of the damper wedges and the wedge rings are placed in visco-elastic shear in response to movement of the damper wedges and, hence, provide essentially frictionless movement of the damper wedges under such conditions. This enhances the sensitivity of the strut to certain road conditions. In a second presently preferred embodiment, the damper wedges are replaced by a single split wedge ring.

10 Claims, 3 Drawing Sheets

FRICTIONALLY DAMPED SUSPENSION STRUT

This is a continuation-in-part of Ser. No. 743,935, filed June 12, 1985 now abandoned.

BACKGROUND OF THE INVENTION

This invention relates to suspension struts and, more particularly, to frictionally damped suspension struts. While two presently preferred embodiments of the invention are disclosed herein for application to suspension struts such as those used as front and/or rear suspensions of light weight passenger vehicles, the invention is not limited to such applications and may be used with other types of suspensions and vehicles and in other applications.

SUMMARY OF THE INVENTION

An object of this invention is to provide an improved frictionally damped suspension strut.

Another object of this invention is to provide an improved frictionally damped suspension strut having fewer parts.

Another object of this invention related to that just stated is to provide an improved frictionally damped suspension strut having fewer frictional wear elements.

Another object of this invention is to provide an improved frictionally damped suspension strut having sufficient sensitivity to small force inputs, such as those encountered under so called "tar strip " road conditions, that harshness in the ride cotained is minimized or substantially eliminated.

Still another object of this invention is to provide a frictionally damped suspension strut in which lateral loading on a telescoping load bearing assembly is minimized or substantially eliminated.

Another object of this invention is to provide a frictionally damped suspension strut in which the frictional damping force is applied evenly about substantially the entire periphery of a cylindrical portion of a telescoping load bearing assembly.

To achieve these objects, and in accordance with the principles of this invention, this invention provides a first load bearing member and a second load bearing member telescopically movable within the first load bearing member. A sleeve bearing composed of resilient low friction material is supported adjacent one end of the first, or outer, load bearing member such that the sleeve bearing substantially surrounds the second, or inner, load bearing member as the only bearing between this end of the first load bearing member and the second load bearing member. The sleeve bearing normally provides for a first level of frictional resistance to extension and contraction of the second load bearing member from and into the first load bearing member. A substantially cylindrical portion of the sleeve bearing, however, may be pressed inwardly against the second load bearing member in response to an axial load on the strut, causing the sleeve bearing to provide for a second level of frictional resistance to extension and contraction of the second load bearing member from an into the first load bearing member. This second level of frictional resistance is greater than the first. Consequently, the sleeve bearing alternatively provides (1) low friction telescopic movement of the first and second load bearing members while providing for the first, or lower, level of frictional resistance, and (2) frictionally damped telescopic movement of the first and second load bearing members while providing for the second, or higher, level of frictional resistance.

According to further aspects of this invention, substantially the entire periphery of the sleeve bearing is pressed inwardly against the second load bearing member. In one presently preferred embodiment of this invention, this is accomplished by multiple spaced apart damper wedges, which together squeeze the sleeve bearing into engagement with the second load bearing member—the greater the number of wedges, the more continuous the engagement obtained. In a second presently preferred embodiment, a split wedge ring, having a plurality of spaced apart diametric slots in its outer surface, may be used as the actuator in place of damper wedges. The number and spacing of these slots are selected to ensure substantially continuous contact between the wedge ring and the sleeve bearing. Consequently, the frictional damping force is applied evenly about the entire periphery of the second load bearing member so long as the sleeve bearing provides for frictionally damped telescopic movement of the load bearing members, as just described.

These and other features, objects and advantages of the present invention will become apparent from the detailed description and claims to follow, taken in conjunction with the accompanying drawings in which like parts bear like reference numerals.

DETAILED DESCRIPTION OF THE DRAWINGS

Figure 1:
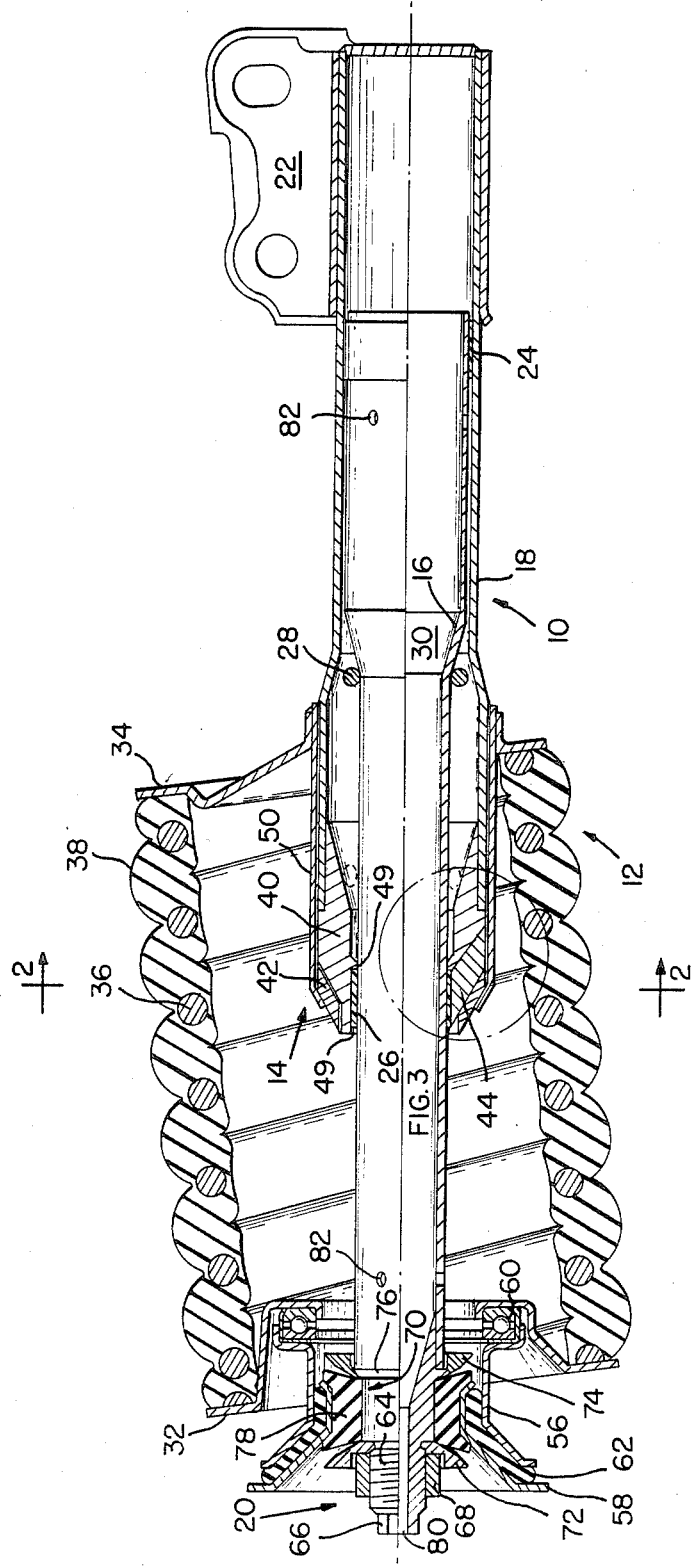
FIG. 1 is a perspective view, partially in longitudinal section, of one presently preferred embodiment of the improved frictionally damped suspension strut of this invention.
Figure 2:
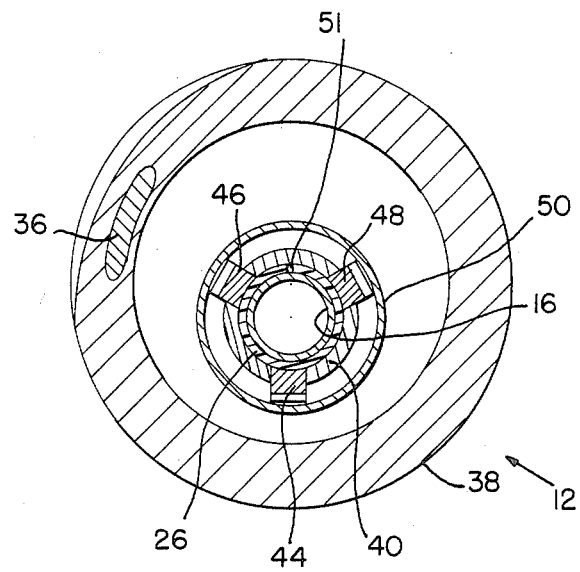
FIG. 2 is a section taken along the line 2—2 in FIG. 1.
Figure 3:
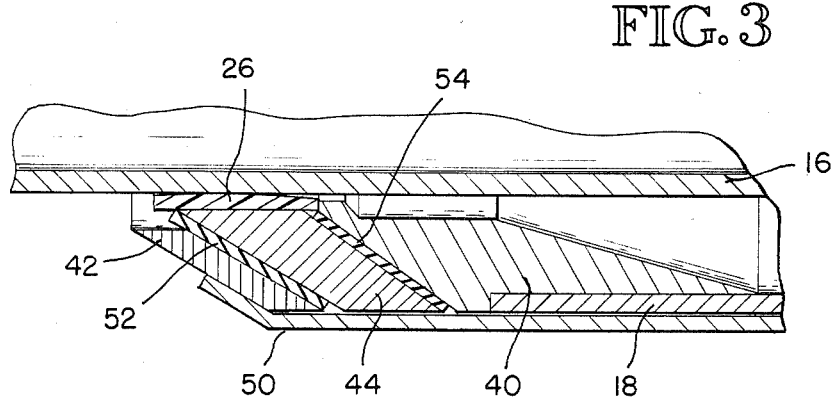
FIG. 3 is a longitudinal section in enlarged scale of a portion of the damping assembly of the FIG. 1 strut.
Figure 4:
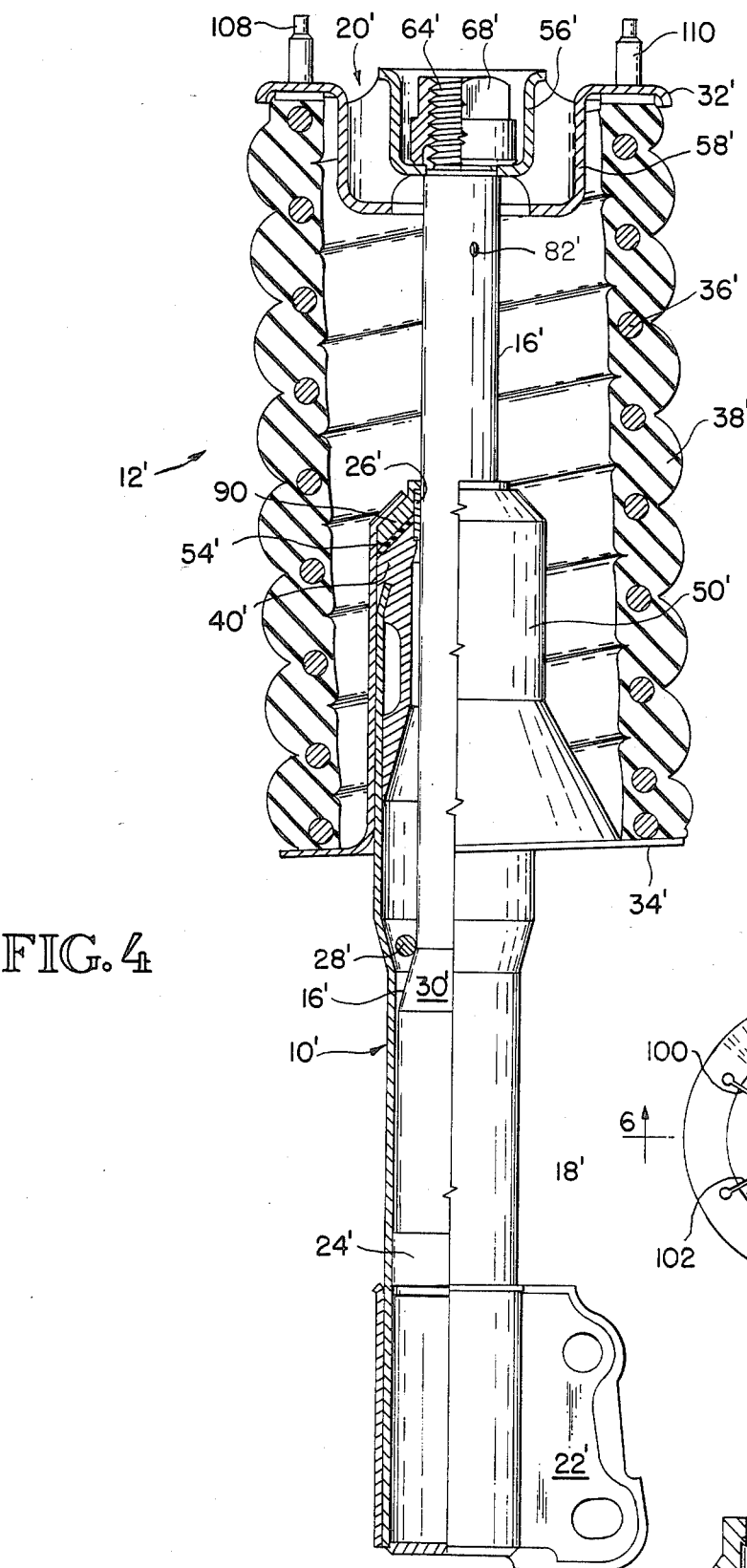
FIG. 4 is a perspective view, partially in longitudinal section, of a second presently preferred embodiment of the improved frictionally damped suspension strut of this invention.
Figure 5:
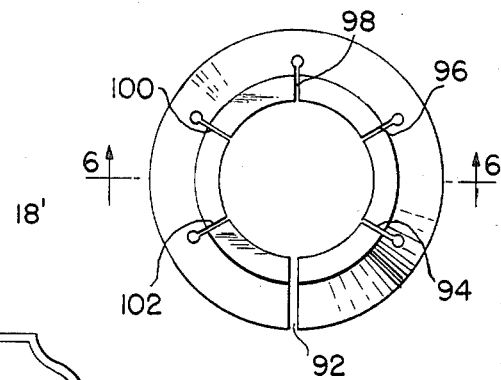
FIG. 5 is a top plan view of the upper wedge ring of the FIG. 4 strut.
Figure 6:
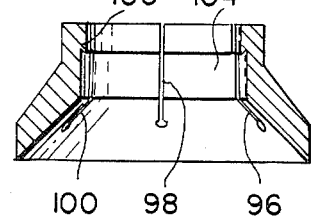
FIG. 6 is a section taken along the line 6—6 in FIG. 5.

Two presently preferred embodiments of the improved frictionally damped suspension strut of this invention are illustrated in FIGS. 1-3 and in FIGS. 4-6, respectively. The FIGS. 1-3 strut, which will be described first, includes movable damper wedges for actuating a sleeve bearing 26 that forms part of the damping assembly. The FIGS. 4-6 strut, is generally similar to the FIGS. 1-3 strut; however, the upper wedge ring provides such actuation in place of the damper wedges. Consequently, the FIGS. 4-6 strut includes no damper wedges.

Referring now to the strut illustrated in FIGS. 1-3, this strut comprises a telescoping load bearing assembly (generally referenced by numeral 10) that extends through a composite spring (generally referenced by numeral 12) and a frictional damping assembly (generally referenced by numeral 14). The composite spring 12 and the damping assembly 14 respectively provide resilient load bearing support for and dampen telescopic movement of the load bearing assembly 10. The damping assembly 14 is operated by the composite spring 12. With this construction, the ride frequency obtained (i.e., the frequency at which the body or sprung mass oscillates with respect to the wheel) remains substantially constant within a predetermined load range. As the front and/or rear suspension of a light weight passenger vehicle, this load range may be selected so that it corresponds to the optimum load range of the vehicle.

The load bearing assembly 10 includes two telescopically movable tubular members, an inner member 16 and an outer member 18, adapted to extend and contract reciprocatively from the design position illustrated toward an extended rebound position and a contracted jounce position, respectively. The inner ends of these members are telescopically movable a distance related to the lengths of the rebound and jounce strokes of the load bearing assembly. The outer ends of these members are adapted to be secured to a vehicle; in the example, the outer end of member 16 is adapted to be secured to a vehicle body (not shown) by mounting assembly 20 and the outer end of member 18 is adapted to be secured to a vehicle steering arm or knuckle (not shown) by mounting assembly 22.

Two spaced apart bearings act between the members 16 and 18 to provide for low friction telescoping movement of them. In the example illustrated in FIG. 1, these bearings are provided in the form of a first sleeve bearing 24 mounted by the inner end of member 16 and by a second sleeve bearing 26 mounted by the damping assembly 14. (Bearing 26 also serves as part of the damping assembly 14, as will be described presently.) In the example, both bearings have curved contact faces and are formed of any suitable low friction material, preferably a material having a coefficient of static friction less than its coefficient of dynamic friction.

The inner end portion of member 16 underlying bearing 24 is of enlarged diameter that registers with the diameter of the outer end portion of member 18 for a distance corresponding to the rebound stroke of assembly 10. The outer end portion of member 16 is of reduced diameter. Likewise, the outer end portion of member 18 registers with the inner end portion of member 16, while its inner end portion is of enlarged diameter sufficient to encircle assembly 14. A rebound buffer in the form of an elastomeric ring 28 is stretched around member 16 adjacent an intermediate portion 30 of tapered outline. As depicted in phantom lines in FIG. 1, ring 28 is adapted to roll and be squeezed between portion 30 and the damping assembly at the rebound position of the assembly 10. Ring 28 therefore acts as a rebound buffer that resiliently resists further extension of assembly 10.

The composite spring 12 acts between member 16 and the damping assembly 14. It is compressible axially between a first spring support 32 mounted by assembly 20 and a second spring support 34 that projects outwardly from assembly 14. In the example, spring 12 is canted axially with respect to the longitudinal axis of the strut so that lateral loads on the load bearing assembly are minimized or substantially eliminated. The extent to which spring 12 is thus canted is related to the load geometry of the particular suspension system with which the strut is used, and therefore may vary accordingly. The spring supports 32 and 34 are so constructed and arranged that spring 12 is supported in this position, and is compressed along its deflection axis, in response to extension and contraction of the load bearing assembly.

The composite spring is made up of a coil spring 36 embedded in and bonded to a tubular body 38 of suitable elastomer. At the design position illustrated, the body bulges in the axial spaces between adjacent convolutious of spring 36, forming a continuous rubber coil spring in which each individual "coil" is formed by one of these lateral bulges. It will be recognized, however, that variable or constant rate coil springs, elastomer springs, or both, may be used in place of or in combination with spring 12.

The damping assembly 14 is made up of two spaced apart wedge rings 40 and 42, and three damper wedges 44, 46 and 48 (FIG. 2) engaged between them. The damper wedges are guided by and project inwardly through slots formed in ring 40. Bearing 26 is supported and restrained against movement within a recess bounded by spaced apart circumferential shoulders 49 formed by ring 40. The damper wedges bear upon bearing 26 and squeeze it between them into frictional gripping engagement with the outer surface of member 16 in response to application of an axial load on assembly 12. As most clearly shown in FIG. 2, bearing 26 is split at 51 so that it possesses sufficient hoop strain capacity that it can absorb the contractive forces exerted on it by this squeezing action and achieve a substantially circumferential grip upon member 16. Unlike other frictionally damped suspension struts, bearing 26 therefore acts as the frictional wear element that exerts the frictional damping or drag force on assembly 12. This of course reduces the number, and greatly simplifies the replacement of, the frictional wear elements.

The damping assembly 14 further includes a cylindrical carrier 50 that surrounds the inner end portion of member 18 at close clearance and is movable with respect to member 18 along the longitudinal axis of the strut. As most clearly shown in FIGS. 1 and 3, the outer end of carrier 50 mounts spring support 34, and its inner end overlaps and bears axially upon wedge ring 42. This ring therefore acts between carrier 50 and the damper wedges when carrier 50 is drawn toward the outer end of member 18 (or to the right as illustrated in FIG. 1). The other wedge ring 40 registers with and is supported by the inner end of member 18, and may be secured to member 18 by any suitable means to cause it to move conjointly with member 18. Although carrier 50 and wedge ring 42 are illustrated as being separate parts, it may be desirable in certain production applications, such as where the strut is already "tuned" for a specific suspension application, to combine them into a single part. (The manner in which the strut may be "tuned" is described hereinafter.)

The damper wedges 44, 46 and 48 are urged inwardly in response to the wedging action produced between rings 40 and 42 when carrier 50 is drawn toward the outer end of member 18. This is the result of the force generated by spring assembly 12 being compressed between supports 32 and 34 in response to an axially directed load on assembly 12. The damper wedges are thus urged inwardly in unison, and produce a compressive force on bearing 26 that is proportional to the axial load applied to the strut. The frictional damping force obtained as a result of the gripping action of bearing 26 on member 16 therefore is correspondingly proportional to applied load. In most practical applications, three or more damper wedges should provide satisfactory deformation of bearing 26. The frictional damping force obtained is controllable in accordance with the extent of this bearing deformation and the resultant engagement of it with member 16. It is believed that the effectiveness of the frictional damping thus obtained is enhanced by distributing this force evenly about the entire periphery of member 16. This is accomplished by appropriate selection of the number and spacing between the damper wedges.

In addition, the frictional damping force is controllable in accordance with the wedge angles of the damper wedges and may even be controlled so that it varies depending upon whether the strut is being subjected to jounce or rebound conditions. For many light weight passenger vehicle applications, for example, the drag force preferably is greater during rebound conditions than jounce conditions. One way to accomplish this is to provide different wedge angles so that the wedge angle in the rebound direction is greater than that in the jounce direction, as is the case with rings 40 and 42 in the illustrated example. Further, by selective substitution of the damper wedges and one or both wedge rings to provide certain wedge angles, the frictional damping force obtained may be so controlled that it is possible to "tune" the strut to a particular suspension application.

The damper wedges are movable without the frictional resistance that heretofore resulted from direct contact by them with the wedge rings. Until this invention, it was believed to be possible to reduce, but not effectively eliminate, such frictional resistance in order to enhance the sensitivity of the damping assembly to tar strip and certain high frequency force inputs to the strut. The accomplishment of this object has been sought after because an increase in such sensitivity was known to reduce undesirable harshness in the ride characteristics obtained.

This invention accomplishes this object by interposing elastomeric shear pads between one or both pairs of interactive faces of the damper wedges and their respectively associated wedge rings. In the example illustrated in FIG. 3, elastomer layers 52 and 54 are interposed between the interactive faces of both wedge rings and damper wedge 44. Similar elastomer layers not shown are interposed between corresponding faces of the other two damper wedges and both wedge rings. When the damper wedges are urged inwardly, these layers are placed in visco- elastic shear. Since there is no direct contact between the wedge rings and the damper wedges, movement of the damper wedges therefore is essentially frictionless.

Referring again to FIG. 1, the mounting assembly 20 includes a tubular housing 56 that surrounds a flanged mount 58. Mount 58 is or may be compatible with the body mounts customarily used for MacPherson struts. The inner end of housing 56 is connected by a thrust bearing 60 with support 32. Consequently, rotative movement of assembly 20 is isolated by bearing 60 from support 32. The space between housing 56 and mount 58 is filled with elastomer 62 or other suitable material for providing cushioning and shock isolation. The outer end portion of member 16 is threaded externally at 64, and terminates in an outer end that includes flats 66 or is otherwise shaped to be engageable with an appropriate holding tool. Member 16 is secured in the position illustrated in FIG. 1 by a nut 68 that is threaded onto member 16 and, when tightened, causes an expansion assembly 70 to expand outwardly against and resiliently engage the inner face of mount 58, as shown (FIG. 1).

Assembly 70 is made up of two spaced apart washers 72 and 74 that respectively contact nut 68 and a shoulder 76 formed in member 16. These washers are separated by an elastomeric expansion ring 78 that bulges outwardly and engages mount 58 in response to being compressed axially between washers 72, 74 in response to tightening of nut 68. In the assembled position illustrated, end 66 projects outwardly beyond nut 68 when it is fully tightened. This allows end 66 to be held against rotation by a holding tool when the strut is being mounted on or dismounted from a vehicle.

In the example illustrated in FIG. 1, the inner end of member 16 is closed, as is the outer end of member 18. The outer end portion of member 16 at 64, however, contains a vent passage 80 through which internal pressure that may be built up within assembly 10 during extension and contraction can be relieved. Suitable vent holes 82 may be formed elsewhere in member 16 to provide communication between the interior of member 16 and member 18 at selected positions of assembly 10. These holes provide similar pressure relief with respect to any air spaces within assembly 10, 12 or 14.

Referring now to the strut illustrated in FIGS. 4-6, this strut is generally similar to the FIGS. 1-3 strut, with certain differences, which will be described presently. For sake of brevity, parts of the FIGS. 4-6 strut which correspond to those of the FIGS. 1-3 strut will not be described separately, and are referenced by the same reference numerals, primed.

With specific reference to FIGS. 4-6, a split wedge ring 90 acts between the upper end of carrier 50' and bearing 26'. As illustrated in FIGS. 5 and 6, wedge ring 90 includes five spaced apart, diametric slots 94, 96, 98, 100, and 102. Except for slots 94 and 102, these slots are located at equal intervals about the periphery of wedge ring 90. Slots 94 and 102 are equally spaced on either side of split 92, as shown (FIG. 5). The number and selection of the spacing between these slots is selected so that, when subjected to a radial compressive force as will be described presently, wedge ring 90 is sufficiently resilient that it can conform to, and apply pressure evenly about, the entire periphery of bearing 26'. With further reference to FIG. 6, wedge ring 90 further includes an interior, cylindrically outlined recess 104, which fronts upon an annular shoulder 106. Bearing 26' registers with recess 104, with its upper edge in engagement with shoulder 106. When assembled, as depicted in FIG. 4, wedge ring 90 surrounds, and positively retains, bearing 26' in contact with wedge ring 40'. Consequently, bearing 26' remains in a fixed axial position and moves conjointly with wedge rings 90 and 40'. As in the case of the FIGS. 1-3 strut, the upper end of carrier 50' overlaps and bears down upon wedge ring 90 in response to the spring force exerted by spring 12'. Unlike the FIGS. 1-3 strut, however, wedge ring 90 bears directly against and presses bearing 26' against member 16'. Inasmuch as wedge ring 90 is conformable to and extends about the entire periphery of bearing 26', however, bearing 26' is pressed against member 16' correspondingly. Consequently, the frictional damping force is applied to member 16' evenly about its entire periphery.

In addition to eliminating the requirement for damper wedges, the FIGS. 4-6 strut also eliminates the need for bearing 60. In the FIGS. 4-6 strut, rotative movement of member 18' appears as rotative shifting between carrier 50' and the underlying portions of member 18', wedge ring 40', and wedge ring 90. To this end, carrier 50' is so constructed that it is slidable, both rotatively and axially, with respect to these members, at close clearance. To aid in free sliding movement at these interfaces, moreover, the confronting surfaces of these members may be coated with appropriate material of low coefficient of friction. In the example, unlike the FIGS. 1-3 strut, there is no layer of elastomer between the outer face of wedge ring 90 and the opposing, adjacent face of carrier 50'. In addition, unlike the FIGS. 1-3 strut, mount 20' includes two spaced apart, upstanding threaded connectors 108 and 110, which respectively engage, and are securable in, appropriate mounting holes in the vehicle body for supporting and mounting the upper end of the strut.

While two presently preferred embodiments of this invention have been illustrated and described herein, variations will become apparent to one of ordinary skill in the art. Accordingly, the invention is not to be limited to the particular embodiments illustrated and described herein, and the true scope and spirit of the present invention are to be determined by reference to appended claims.

The embodiments of the invention in which an exclusive property or privelege is claimed are defined as follows:

1. A frictionally damped suspension strut, comprising:
   a first load bearing member;
   a second load bearing member telescopically movable within said first load bearing member;
   a sleeve bearing composed of resilient low friction material;
   support means mounted by said first load bearing member for supporting said sleeve bearing adjacent one end of said first load bearing member such that said sleeve bearing substantially surrounds said second load bearing member as the only bearing between said one end of said first load bearing member and said second load bearing member, while simultaneously therewith providing for a first level of frictional resistance to extension and contraction of said second load bearing member from and into said first load bearing member; and
   acutuator means operatively associated with said support means for pressing a substantially cylindrical portion of said sleeve bearing inwardly against said second load bearing member in response to an axial load on the strut, causing said sleeve bearing to provide for a second level of frictional resistance to extension and contraction of said second load bearing member from and into said first load bearing member, said second level of frictional resistance being greater than said first level of frictional resistance;
   whereby said sleeve bearing alternatively provides (1) low friction telescopic movement of said first and second load bearing members while providing for said first level of frictional resistance, and (2) frictionally damped telescopic movement of said first and second load bearing members while providing for said second level of frictional resistance.

2. The strut of claim 1, wherein said actuator means press said sleeve bearing portion inwardly against said second load bearing member with a force which incresases in accordance with the magnitude of said axial load, whereby said second level of frictional resistance is proportional to said axial load.

3. The strut of claim 1, wherein said actuator means include at least one damper wedge which is movable inwardly against said sleeve bearing.

4. The strut of claim 1, wherein said actuator means include a split wedge ring which is contractable against said sleeve bearing.

5. The strut of claim 4, wherein said wedge ring includes an outer surface forming a plurality of spaced apart diametric slots.

6. The strut of claim 2, 3, 4, or 5, wherein said sleeve bearing portion extends about substantially the entire periphery of said second load bearing member.

7. The strut of claim 1, wherein said actuator means are movable with respect to said support means, and further comprising a layer of elastomer interposed between said actuator means and said support means, said elastomer layer being so constructed and arranged that it provides essentially frictionless movement of said actuator means.

8. The strut of claim 1, further comprising an elastomeric ring stretched about said second load bearing member adjacent means forming a first conical surface, and wherein said support means include a second conical surface so positioned that said ring will be squeezed between said first conical surface and said second conical surface when said second load bearing member is extended a predetermined distance from said first load bearing member, thereby resisting further extension of said second load bearing member.

9. The strut of claim 1, further comprising two spaced apart spring support means respectively projecting transversely from said first load bearing member and said second load bearing member, and a tubular load bearing spring supported between said two spring support means so as to form a closed-ended cylindrical chamber in coaxial relation to said first and second load bearing members, said second load bearing member forming a passage through which air from outside of the strut may be introduced into said chamber.

10. The strut of claim 9, wherein said spring is rotatable conjointly with one of said load bearing members with respect to the other load bearing member, and further comprising bearing means acting between said spring and said other load bearing member.

* * * * *